United States Patent [19]

Idel

[11] 4,064,770
[45] Dec. 27, 1977

[54] MACHINE FOR SHARPENING BAND SAW TEETH

[76] Inventor: Vladimir Viktorovich Idel, ulitsa Gertseana, 3, kv. 37, Zavolzhie Gorkovskoi oblasti, U.S.S.R.

[21] Appl. No.: 698,134

[22] Filed: June 21, 1976

Related U.S. Application Data

[63] Continuation of Ser. No. 556,539, March 7, 1975, abandoned.

[30] Foreign Application Priority Data

June 24, 1974 U.S.S.R. ............................. 2032128
June 24, 1974 U.S.S.R. ............................. 2032129

[51] Int. Cl.² .......................................... B23D 63/12
[52] U.S. Cl. ................................................. 76/37
[58] Field of Search ........................................ 76/37

[56] References Cited

U.S. PATENT DOCUMENTS

| | | |
|---|---|---|
| 3,611,839 | 10/1971 | Idel et al. ................ 76/37 |
| 3,783,714 | 1/1974 | Idel ......................... 76/37 |
| 3,802,299 | 4/1974 | Idel ......................... 76/37 |
| 3,822,613 | 7/1974 | Idel ......................... 76/37 |

Primary Examiner—James L. Jones, Jr.
Assistant Examiner—James G. Smith
Attorney, Agent, or Firm—Haseltine, Lake & Waters

[57] ABSTRACT

A machine, wherein there are mounted on a base a sharpening mechanism with a grinding wheel, as well as a mechanism for feeding a saw to the grinding wheel and a mechanism for pitch feed of the saw relative to the grinding wheel which are in force transmitting connection therebetween. The mechanism for feeding the saw to the grinding wheel mounts a resilient clamping means for supporting the saw in a floating position and a means for braking the saw having a stop fastened thereto which cooperates, during the sharpening of edges of the adjacent saw teeth, with a cam fixed to the base so as to provide for release of the saw from braking. This machine allows the sharpening of saw teeth practically under any desired operating conditions, while improving the finish and accuracy of the manufacture.

1 Claim, 4 Drawing Figures

MACHINE FOR SHARPENING BAND SAW TEETH

CROSS-RELATED APPLICATION

This is a continuation, of application Ser. No. 556,539 filed Mar. 7, 1975 now abandoned.

The present invention relates to machines for sharpening band saw teeth.

Known in the art is my earlier U.S. Pat. No. 3,833,613 are machines for sharpening band saw teeth comprising a base supporting a sharpening mechanism with a grinding wheel and a mechanism for feeding the saw to the grinding wheel for sharpening edges of the adjacent teeth which is in force transmitting connection with a mechanism for pitch feed of the saw relative to the grinding wheel. This pitch feed is effected upon sharpening edges of the adjacent teeth. The mechanism for feeding the saw to the grinding wheel supports a resilient clamping device for clamping the saw at the side and rear surfaces so as to ensure a floating position of the saw relative to the grinding wheel. Support members are fixed to the resilient clamping device, and the addenda of the saw teeth are successively supported by these support members. One of the support members is located before the grinding wheel in the direction of the pitch feed of the saw, and the other support member is located behind the grinding wheel in the direction of this feed. This support member has a portion which is inclined with respect to the pitch feed direction, and the addenda of the saw teeth are successively supported at this portion.

A device for braking the saw is mounted on the mechanism for feeding the saw to the grinding wheel before the resilient clamping device in the direction of the pitch feed of the saw at some distance therefrom. This device has a lever supporting a pressure member which is in a permanent resilient contact with the side surface of the saw. The pressure member is mounted adjacent to said support member located before the grinding wheel in the direction of the pitch feed of the saw.

The disadvantage of the above-described machine for sharpening saw teeth consists in that the pressure member of the braking device is in a permanent resilient contact with the side surface of the saw. At high sharpening speeds, as well as with large angles of inclination of the portion of the support member with respect to the direction of the pitch feed of the saw (larger than the self-locking angle), the resilient contact hampers the floating of the saw during the sharpening of edges of the adjacent teeth which, in turn, results in impaired finish and lower accuracy of the saw manufacture as regards the pitch.

It is an object of the present invention to provide a machine for sharpening band saw teeth, wherein there is provided means ensuring the release of the saw from braking during the sharpening of edges of the adjacent teeth.

Another object of the invention is to improve the finish of the surfaces being machined.

Still another object of the invention is to improve the accuracy of the saw manufacture.

With these and other objects in view there is provided a machine for sharpening band saw teeth having a base supporting a sharpening mechanism with a grinding wheel and a mechanism for feeding a saw to the grinding wheel which is in force transmitting connection with a mechanism for pitch feed of the saw relative to said grinding wheel, and wherein there are provided on the mechanism for feeding the saw to the grinding wheel a resilient clamping device for supporting the saw in a floating position having at least two support members for supporting the addenda of the saw teeth which are mounted in the direction of the pitch feed of the saw in such a manner that one support member is mounted before the grinding wheel and the other — therebehind, and a device for braking the saw having a pressure member in a resilient contact with the side surface of the saw which is located adjacent to the support member mounted before the grinding wheel, according to the invention, there are provided an adjustable stop mounted on the device for braking the saw, and an adjustable cam mounted on the base cooperating with said stop during the sharpening of edges of the adjacent saw teeth, whereby the saw is released from braking.

The machine for sharpening band saw teeth according to the present invention permits to sharpen saw teeth practically under any desired operating conditions, while improving the finish of the surface being machined and accuracy of machining.

Other objects and advantages of the machine for sharpening band saw teeth will be apparent from the following detailed description of a specific embodiment of the invention with reference to the accompanying drawings, in which:

FIG. 4 shows the position of the grinding wheel in the deddendum between edges of the adjacent teeth.

Figure 1:
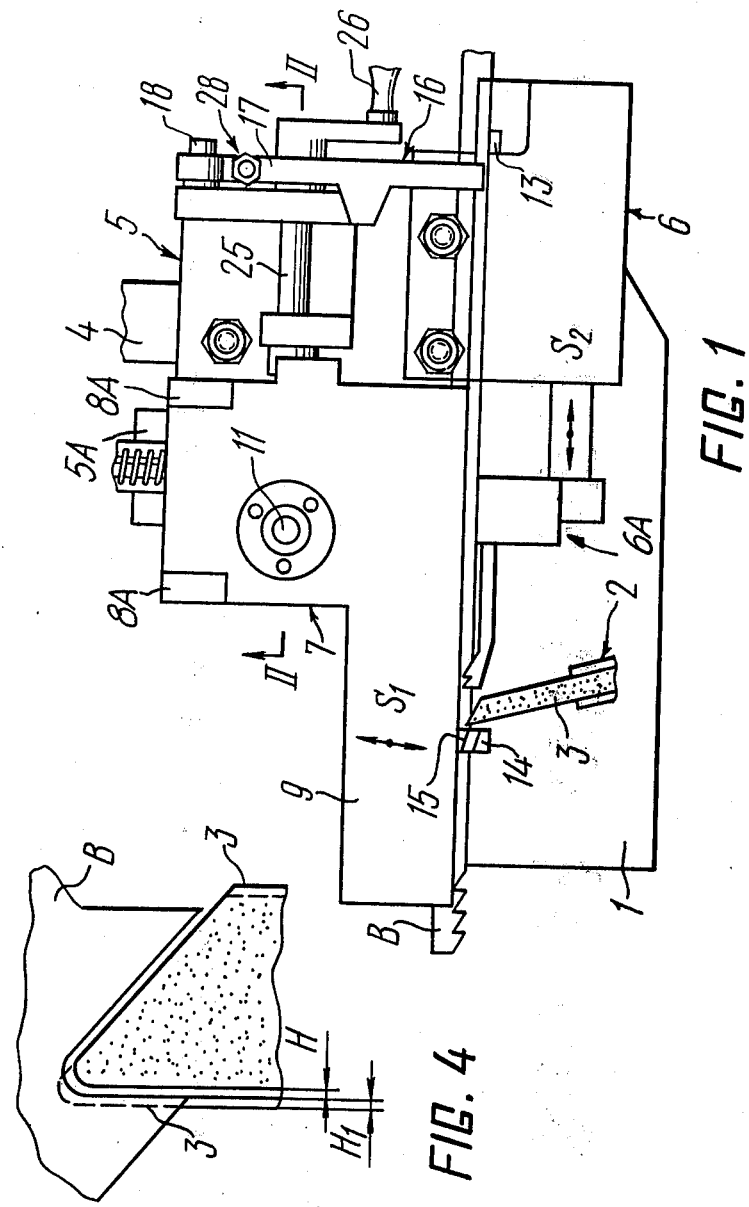
FIG. 1 shows a general plan view of the machine for sharpening band saw teeth according to the invention.

The machine for sharpening teeth of a band saw B (FIG. 1) comprises a base 1 supporting a sharpening mechanism 2 with a grinding wheel 3 and a carriage 4 supporting a mechanism 5 for feeding the saw B to the grinding wheel 3 for sharpening edges of the adjacent teeth of the saw and a mechanism 6 for pitch feed of the saw B relative to the grinding wheel 3 after the sharpening of edges of the adjacent saw teeth. The mechanism 5 is driven by a mechanism 5A for feeding the saw transversely (direction $S_1$) with respect to the saw B and the mechanism 6 is driven by a mechanism 6A for pitch feed of the saw (direction $S_2$). The mechanisms 5 and 6 for feeding the saw B are operatively connected to provide matched displacement of the saw B to the grinding wheel 3 and its pitch feed relative to the grinding wheel, respectively.

Figure 2:
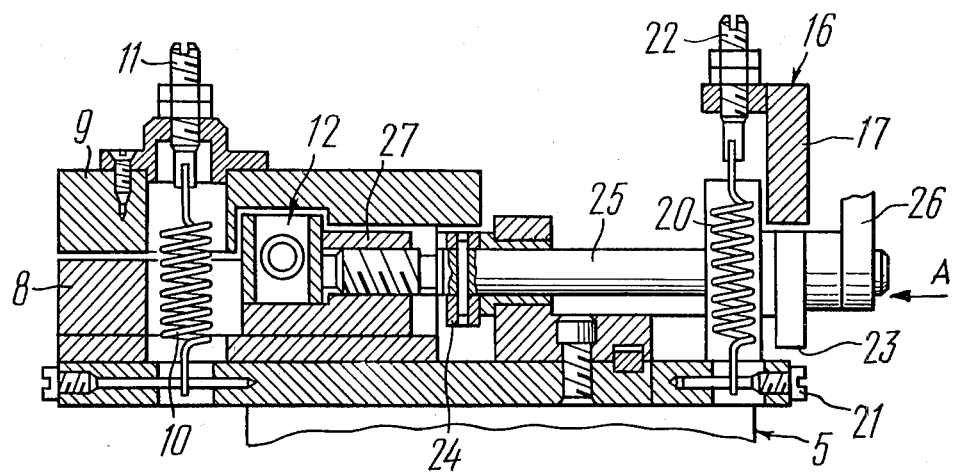
FIG. 2 is a sectional view taken along the line II—II in FIG. 1.

A resilient clamping device 7 is mounted on the carriage 4 for supporting the saw in a floating position. This device comprises a housing 8 (FIG. 2) closed with a cover 9. The housing 8 pivotably supports the cover 9 at journal 8a spring-loaded by means of a which is spring 10 having one end fixed to the housing 8 and the other end fixed to the cover 9 by means of an adjusting bolt 11.

The flat surfaces of the housing 8 and cover 9 facing each other serve as guides and hold the saw B at the side surfaces thereof.

The guides may comprise rollers mounted in pairs in the cover and housing, respectively, and facing each other in each pair.

The housing 8 also accommodates a device 12 for supporting the saw at the rear face thereof.

The housing 8 mounts support members 13 (FIG. 1) and 14 successively supporting the addenda of teeth of the saw B with their apexes.

The support member 13 is mounted before the grinding wheel 3 in the direction $S_2$ of the pitch feed of the saw. The support member 14 having an inclined portion 15 which successively engages the addendum of each tooth of the saw is mounted behind the grinding wheel 3 in the direction $S_2$ of the pitch feed of the saw.

Figure 3:
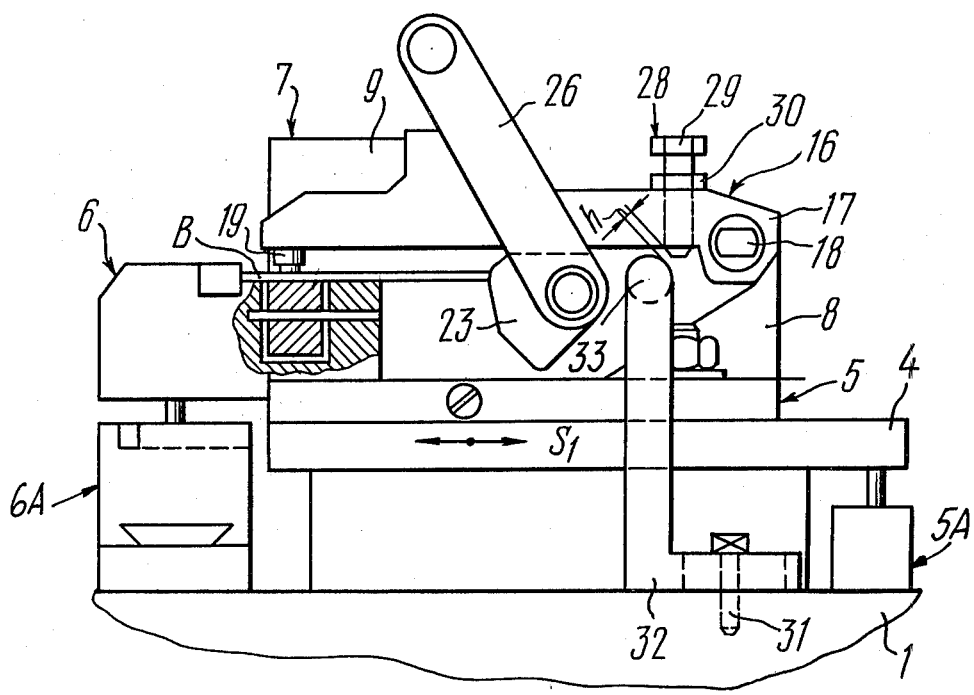
FIG. 3 is a view taken along the arrow A in FIG. 2.

Mounted on the carriage 4 with some spacing from the resilient clamping device 7, there is a device 16 for braking the saw B. This device comprises a lever 17 (FIGS. 1,3) having its pivot 18 fixed to the carriage 4. A pressure member 19 (FIG. 3) is fixed at the end of the lever 17 and is resiliently urged against the side surface of the saw (against the saw blade). The resilient urging of the pressure member 19 against the side surface of the saw B is provided by a spring 20 biasing the lever 17 (FIG. 2), the spring having one end connected to the carriage 4 by means of a bolt 21 and the other end connected to the lever 17 by means of an adjustment bolt 22.

For concurrent pivotal movement of the cover 9 and lever 17 during the feeding of the saw in the guides, the lever 17 and the cover 9 cooperate with eccentrics 23 and 24, respectively, mounted on a shaft 25. A handle 26 is fixed to one end of this shaft, and a nut 27 fixing the position of the device 12 for supporting the saw at the rear face is mounted on the other end of the shaft.

A stop 28 (FIG. 3) comprising a screw 29 and a nut 30 is mounted on the lever 17 of the device 16 for braking the saw.

A cam 32 is mounted on the base 1 by means of a bolt 31, the cam carrying a roller 33 at the end thereof facing the stop 28. The stop 28 and the cam 32 cooperate with each other for releasing the saw from braking during the sharpening of edges of the adjacent teeth, that is to relieve the saw off the pressure force applied to the side surface of the saw by the device 16.

The stop 28 is adjustable for adjusting the distance "h" between the stop and the cam 32 by screwing the screw 29.

This distance may be also varied by vertically displacing the cam, and for that purpose the cam is also made adjustable.

The amount of the distance "h" depends on the position of the grinding wheel 3 in the dedendum, that is between edges of the adjacent teeth at the instant of the release of the saw from braking.

Where the braking of the saw B is started with the grinding wheel 3 in the dedendum in a position such that there is a space "H" (FIG. 4) between the grinding wheel and the leading edge of a tooth, the distance between the stop 28 and the cam 32 is greater than in the case, where the release of the saw B from braking is started after the feed-in of the grinding wheel 3 (the position shown with dotted lines in FIG. 4) at the leading edge at a depth "$H_1$".

Where the position of the resilient clamping device 7 on the base 1 of the machine was changed during the adjustment of the machine, the cam 32 may be horizontally adjusted on the base 1 by loosening attachment bolt 31.

The machine for sharpening band saw teeth according to the invention functions in the following manner.

First, the machine is adjusted, and for that purpose the handle 26 is rotated clockwise to rotate the shaft 25 and the eccentrics 23 and 24 fixed thereto which act on the cover 9 and lever 17, respectively, to lift them while expanding the springs 10 and 20. The saw B is placed on the flat guiding surface of the housing 8. Then the handle 26 is rotated counterclockwise to compress the springs 10 and 20 and to lower the cover 9 and the lever 17 with the pressure member 19 onto the side surface of the saw B. At the same time the device 12 is fixed by means of the nut 27.

After the clamping of the saw B, the grinding wheel 3 is positioned relative to the dedenda between the saw teeth, and the machine drive (not shown in the drawings) is energized so that the saw starts moving towards the grinding wheel in the direction $S_1$ and then by pitch, in the direction $S_2$.

The pressure member 19 slides along the side surface of the saw thereby braking it due to the development of sliding friction between the side surface of the saw and the pressure member 19.

The braking of the saw permits smooth control of the metal removal from the tooth edges during the sharpening.

In machining a saw B of a variable stiffness, the force of the spring 20 is adjusted by means of the adjustment bolt 22 to increase or decrease the pressure exerted by the pressure member 19. The adjustment of the spring 20 may be effected directly during the machining of the saw.

Deletereous vibrations of the saw during the machining are partially absorbed by the spring-loaded cover 9, as well as by the spring-loaded lever 17.

During the movement of the saw, along with the resilient clamping device 7 and device 16 for braking the saw, to the grinding wheel 3, the latter starts cutting into the leading edge of a tooth with its periphery adjacent to the forward end face thereof, and, due to the fact that the saw blade is supported in a floating manner, it will be mounted in the direction of the pitch feed under the action of the cutting force. In order to facilitate the displacement of the blade at a desired amount at the instant of engagement of the grinding wheel with the leading edge of a tooth, the pressure force is relieved from the saw for 0.5–0.9 of the time required for sharpening edges of the adjacent teeth that is the saw is released from braking during that time.

For that purpose, at the instant of engagement of the grinding wheel 3 with the leading edge of a tooth, the stop 28 hits against the cam 32. The lever 17 is thus lifted to disengage the pressure member 19 from the saw B which is released from braking and is self-positioned under the action of the cutting force applied by the grinding wheel 3.

The temporary release of the saw from braking permits reducing the resistance offered by the saw to the grinding wheel 3 which thus can additionally displace the saw towards the device 12 thereby providing a required pressure application to the leading edge of a tooth.

During the movement of the saw away from the grinding wheel after a certain time lapse, the stop 28 is disengaged from the cam 32, and the pressure member 19 again engages the saw B. During this time period a final sharpening of edges of the adjacent teeth takes place, that is the dedendum is formed.

After the completion of sharpening of edges of the adjacent teeth, the saw is displaced one pitch, and the sharpening of edges of the next pair of teeth is effected.

Where the machining is performed with a maximum cutting depth "$H_1$", the saw is released from braking with a delay after the instant of engagement of the grinding wheel 3 with the leading edge of the saw, whereas in the case, where the machining is performed with a minimal cutting depth, the saw is released from braking in advance of the instant of engagement of the grinding wheel 3 with the leading edge of the saw tooth.

I claim:

1. A machine for sharpening band saw teeth comprising: a base; a sharpening mechanism with a grinding wheel mounted on said base; means for feeding a saw to the grinding wheel for sharpening edges of the adjacent saw teeth mounted on said base; means for pitch feed of the saw relative to the grinding wheel mounted on said means for feeding the saw to the grinding wheel; said means for feeding the saw to the grinding wheel being connected to said means for pitch feed of the saw; a resilient clamping means for supporting the saw in a floating position, said resilient clamping means being mounted on said means for feeding the saw to the grinding wheel; at least two support members mounted on said resilient clamping means for successively engaging the addendum of each tooth of the saw; one of said support members being mounted before the grinding wheel in the direction of the pitch feed of the saw; the other support member being mounted behind the grinding wheel in the direction of the pitch feed of the saw; means for braking the saw including a pressure member in intermittent contact with the side surface of the saw, said pressure member being mounted adjacent to said one support member mounted before the grinding wheel in the direction of the pitch feed of the saw; a stop adjustably mounted on said means for braking the saw; a cam adjustably mounted on said base; and said stop cooperating with said cam during the sharpening of edges of the adjacent saw teeth, whereby the saw is released from braking.

* * * * *